(12) United States Patent
Zheng

(10) Patent No.: US 11,767,981 B2
(45) Date of Patent: Sep. 26, 2023

(54) FOLDABLE TRAY DEVICE FOR GAS CYLINDER OF STOVE

(71) Applicant: Ningbo Huige Outdoor Products Co., Ltd., Zhejiang (CN)

(72) Inventor: Songcun Zheng, Zhejiang (CN)

(73) Assignee: Ningbo Huige Outdoor Products Co., Ltd., Zhejiang (CN)

( * ) Notice: Subject to any disclaimer, the term of this patent is extended or adjusted under 35 U.S.C. 154(b) by 204 days.

(21) Appl. No.: 17/243,574

(22) Filed: Apr. 29, 2021

(65) Prior Publication Data

US 2022/0228750 A1    Jul. 21, 2022

(30) Foreign Application Priority Data

Jan. 21, 2021 (CN) .......................... 202120173237.5

(51) Int. Cl.
*F24C 3/14* (2021.01)
*F24C 15/08* (2006.01)

(52) U.S. Cl.
CPC ............... *F24C 3/14* (2013.01); *F24C 15/08* (2013.01)

(58) Field of Classification Search
CPC ............... F24C 3/12; F24C 3/14; F24C 15/08
USPC .................................. 126/85, 30, 168, 180
See application file for complete search history.

(56) References Cited

U.S. PATENT DOCUMENTS

| | | | | |
|---|---|---|---|---|
| 4,757,755 | A * | 7/1988 | Sarten | A47J 37/06 D7/334 |
| 2001/0015201 | A1* | 8/2001 | Pollock, III | A47J 37/0786 126/41 R |
| 2011/0094494 | A1* | 4/2011 | Malumyan | A47J 37/0704 126/39 R |
| 2014/0014007 | A1* | 1/2014 | Sinegal | A47B 9/08 108/157.1 |
| 2019/0191868 | A1* | 6/2019 | Bowser | F16B 12/42 |
| 2019/0293233 | A1* | 9/2019 | DeVoe | F16M 13/022 |
| 2021/0262698 | A1* | 8/2021 | Liu | F24B 1/181 |

FOREIGN PATENT DOCUMENTS

| | | | |
|---|---|---|---|
| CN | 209083799 U | * | 7/2019 |
| CN | 213570624 U | * | 6/2021 |

* cited by examiner

*Primary Examiner* — Allen R. B. Schult
*Assistant Examiner* — William C Weinert
(74) *Attorney, Agent, or Firm* — JCIPRNET

(57) ABSTRACT

A foldable tray device for a gas cylinder of a stove includes a tray body, a connecting rod and a base. A plurality of universal wheels are arranged at a lower end of the tray body. The connecting rod has an end fixed to a side wall of the tray body and another end hingedly coupled to the base. A locking mechanism is arranged between the another end of the connecting rod and the base. A fixing mechanism configured to be connected to a frame of the stove is arranged on the base.

5 Claims, 5 Drawing Sheets

FOLDABLE TRAY DEVICE FOR GAS CYLINDER OF STOVE

CROSS-REFERENCE TO RELATED APPLICATION

This application claims the priority benefit of China application serial no. 202120173237.5, filed on Jan. 21, 2021. The entirety of the above-mentioned patent application is hereby incorporated by reference herein and made a part of this specification.

BACKGROUND

Technical Field

The invention relates to the technical field of stoves, in particular to a foldable tray device for a gas cylinder of a stove.

Description of Related Art

With the rise of lobsters in recent years, stoves for cooking lobsters have been gradually accepted. Generally, the stoves for cooking lobsters are very heavy due to their large barrel, so an external air cylinder is adopted by most manufacturers and is directly placed on the ground, which makes it very inconvenient to move the ovens by users. Some manufacturers have designed a tray connected to one side of the oven frame to store the air cylinder to ensure that the gas cylinder can be moved along with the frame of the stoves.

However, considering that the temperature around the stove during operation is very high due to the high power of the stoves, generally hundreds of thousands of British thermal unit (BTU), the tray should be kept away from the frame, which makes the whole oven occupy too much space. When no cylinder is placed on the tray, the tray connected to the frame not only occupies a lot of space, but also may trip people and cause injuries, and the tray is inconvenient to disassemble and may be damaged due to repeated assembly and disassembly.

SUMMARY

To overcome the above-mentioned defects of the prior art, the invention provides a foldable tray device for a gas cylinder of a stove, which is convenient to move and easy to fold and store, thus occupying less space.

The technical solution adopted by the invention to settle the aforesaid technical issue is as follows. A foldable tray device for a gas cylinder of a stove includes a tray body, a connecting rod and a base. A plurality of universal wheels are arranged at a lower end of the tray body. The connecting rod has an end fixed to a side wall of the tray body and another end hingedly coupled to the base. A locking mechanism is arranged between the another end of the connecting rod and the base, and a fixing mechanism configured to be connected to a frame of the stove is arranged on the base.

In a preferred embodiment, coupling holes are formed in the base, a mounting hole is formed in the connecting rod, and the coupling holes and the mounting hole are connected through a hinge pin.

In a preferred embodiment, the locking mechanism comprises a button pin mounted on the connecting rod, first positioning holes and second positioning holes are formed in the base, and a connecting line between each of the first positioning holes and a corresponding one of the coupling holes is perpendicular to a connecting line between each of the second positioning holes and a corresponding one of the coupling holes. When the button pin is located in the first positioning holes, the connecting rod is in a horizontal state, and when the button pin is located in the second positioning holes, the connecting rod is in a vertical state.

In a preferred embodiment, the fixing mechanism comprises a fixing plate, an L-shaped plate and a lock bolt. The fixing plate is fixed to a side wall of the base, the L-shaped plate is fixed to an upper end of the fixing plate, a clamping space is formed between the L-shaped plate and the fixing plate, and the lock bolt is mounted on the L-shaped plate.

In a preferred embodiment, a plurality of supports are fixed to the side wall of the tray body, and the plurality of universal wheels are respectively fixed to the supports in a one-to-one correspondence manner.

In a preferred embodiment, a gas tube bracket is fixed to a side wall of one of the supports.

In a preferred embodiment, An accommodating cavity is formed in the tray body and vertically penetrates through the tray body, a butterfly bolt is screwed on at least one of the supports, a tail end of the butterfly bolt sequentially penetrates through the at least one of the supports and the tray body to extend into the accommodating cavity, and a contact piece is fixed to the tail end of the butterfly bolt.

Compared with the prior art, the invention has the following advantages. The whole tray device can be moved easily by means of the universal wheels. The tray body and the base are connected through the connecting rod, and the another end of the connecting rod is hingedly coupled on the base, such that the tray body can be driven by connecting rod to rotate, so as to facilitate storing, thus occupying less space when not used. The connecting rod can be locked on the base by the locking mechanism to be prevented from rotating arbitrarily. The whole tray device can be connected to the frame of the stove by the fixing mechanism. The foldable tray device is convenient to move and easy to fold and store, thus occupying less space.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The invention will be explained in further detail below in conjunction with the accompanying drawings and embodiments, but the invention is not limited to the following description.

Figure 1:
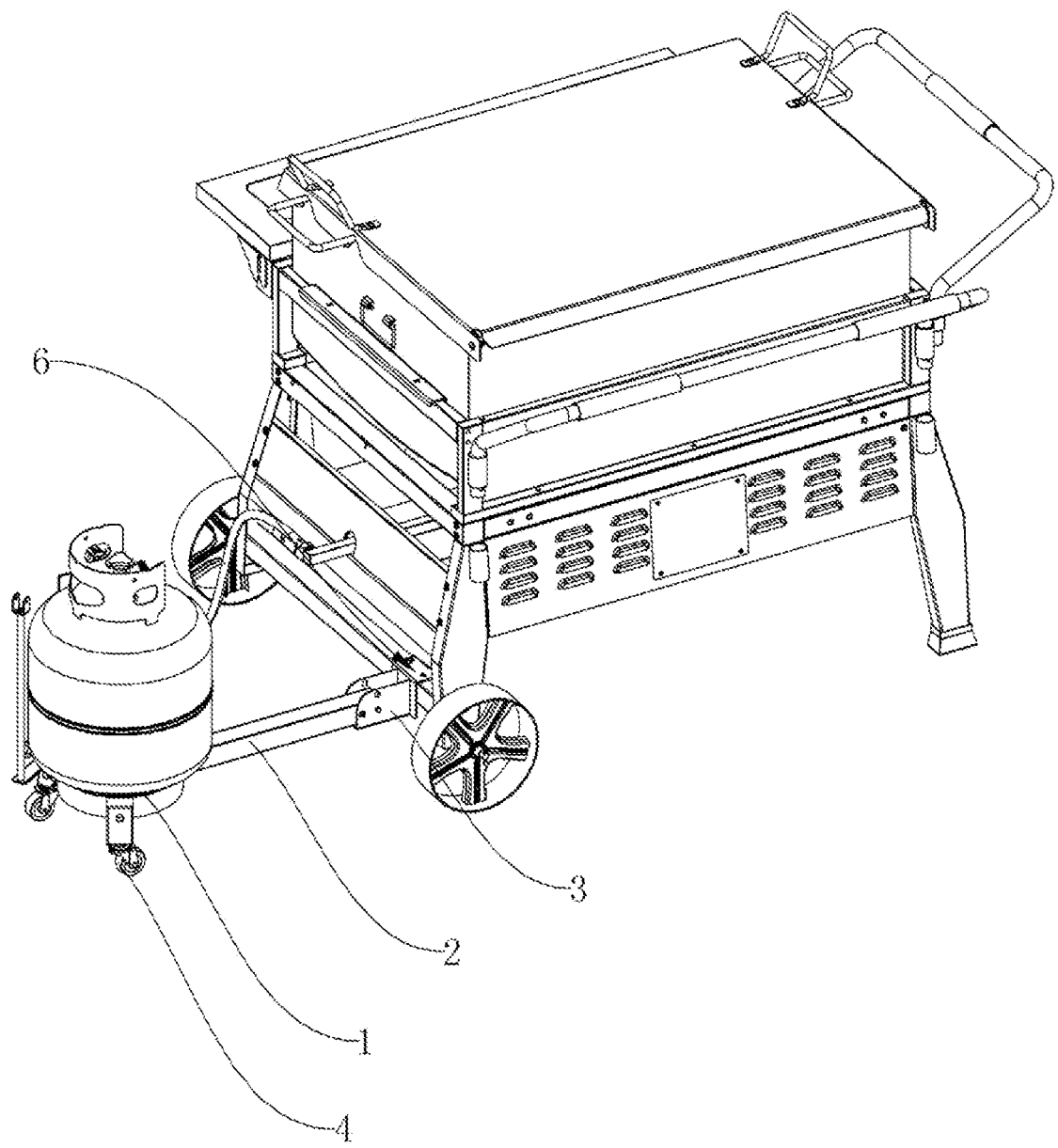
FIG. 1 is a perspective structural view of a foldable tray device of a stove matched with a gas cylinder according to the invention.
Figure 2:
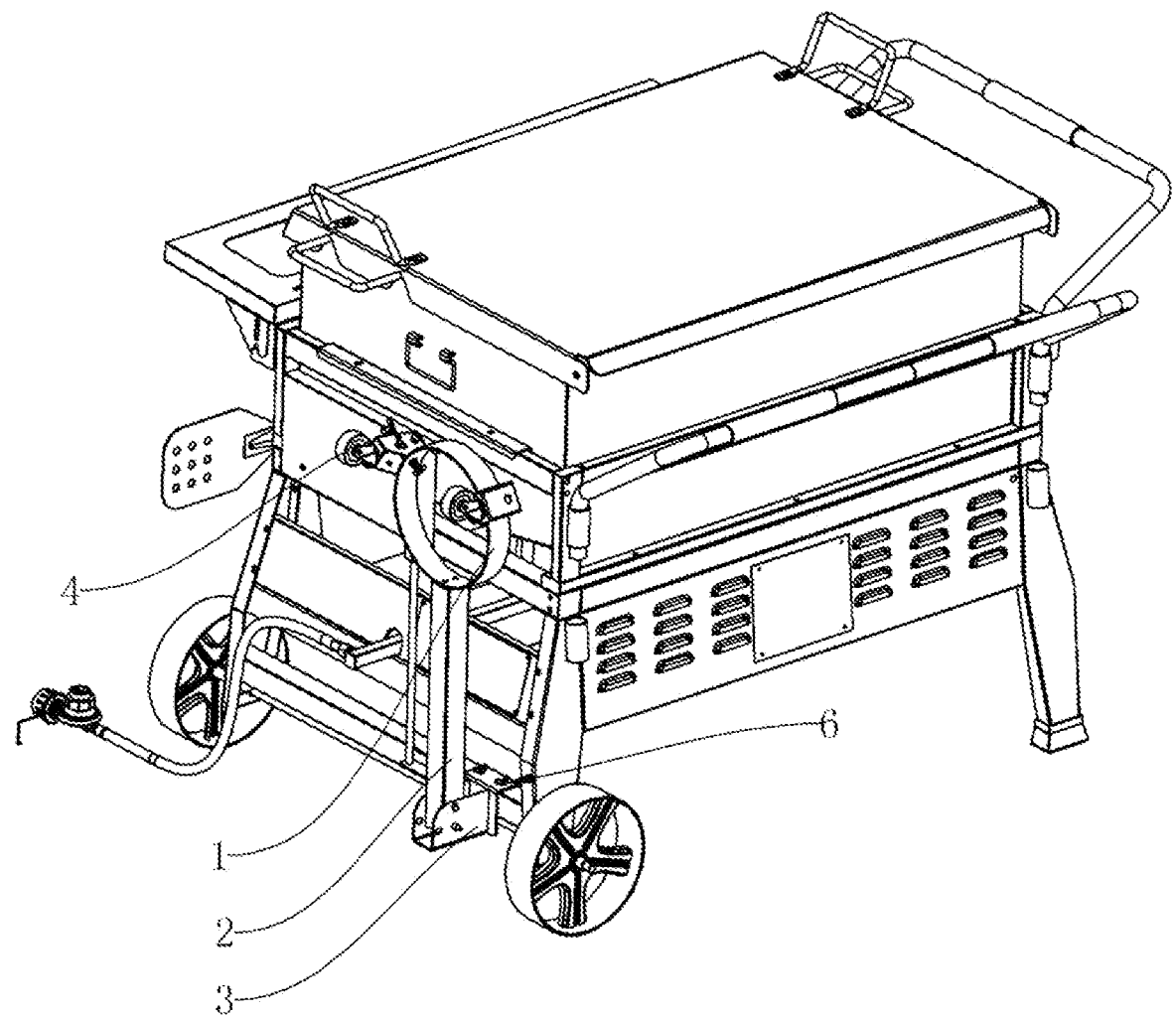
FIG. 2 is a perspective structural view of the foldable tray device in a folded state according to the invention.

As shown in FIG. 1 and FIG. 2, a foldable tray device for a gas cylinder of a stove comprises a tray body 1, a connecting rod 2 and a base 3. A plurality of universal wheels 4 are arranged at a lower end of the tray body 1. One end of the connecting rod 2 is fixed to a side wall of the tray body 1, and another end of the connecting rod 2 is hingedly coupled to the base 3. A locking mechanism 50 is arranged between the another end of the connecting rod 2 and the base 3, and a fixing mechanism 6 configured to be connected to a frame of the stove is arranged on the base 3.

Figure 3:
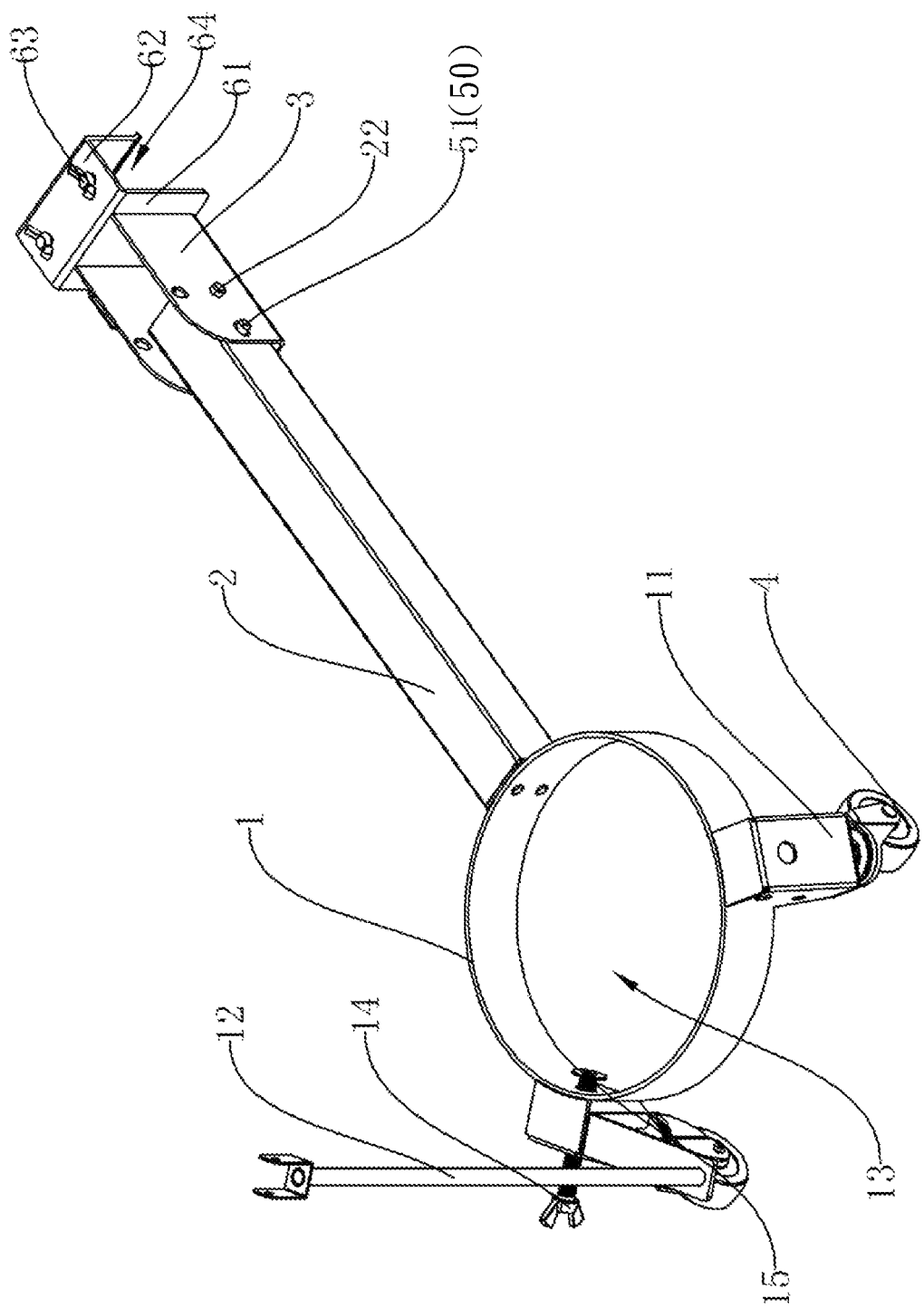
FIG. 3 is a perspective structural view of the foldable tray device according to the invention.
Figure 4:
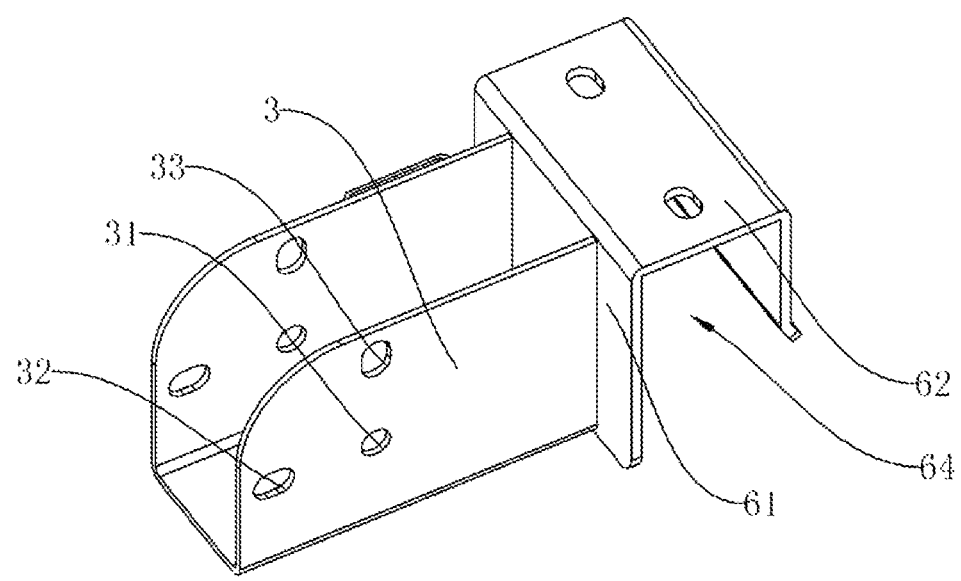
FIG. 4 is a perspective structural view of a base and a fixing mechanism matched with each other according to the invention.
Figure 5:
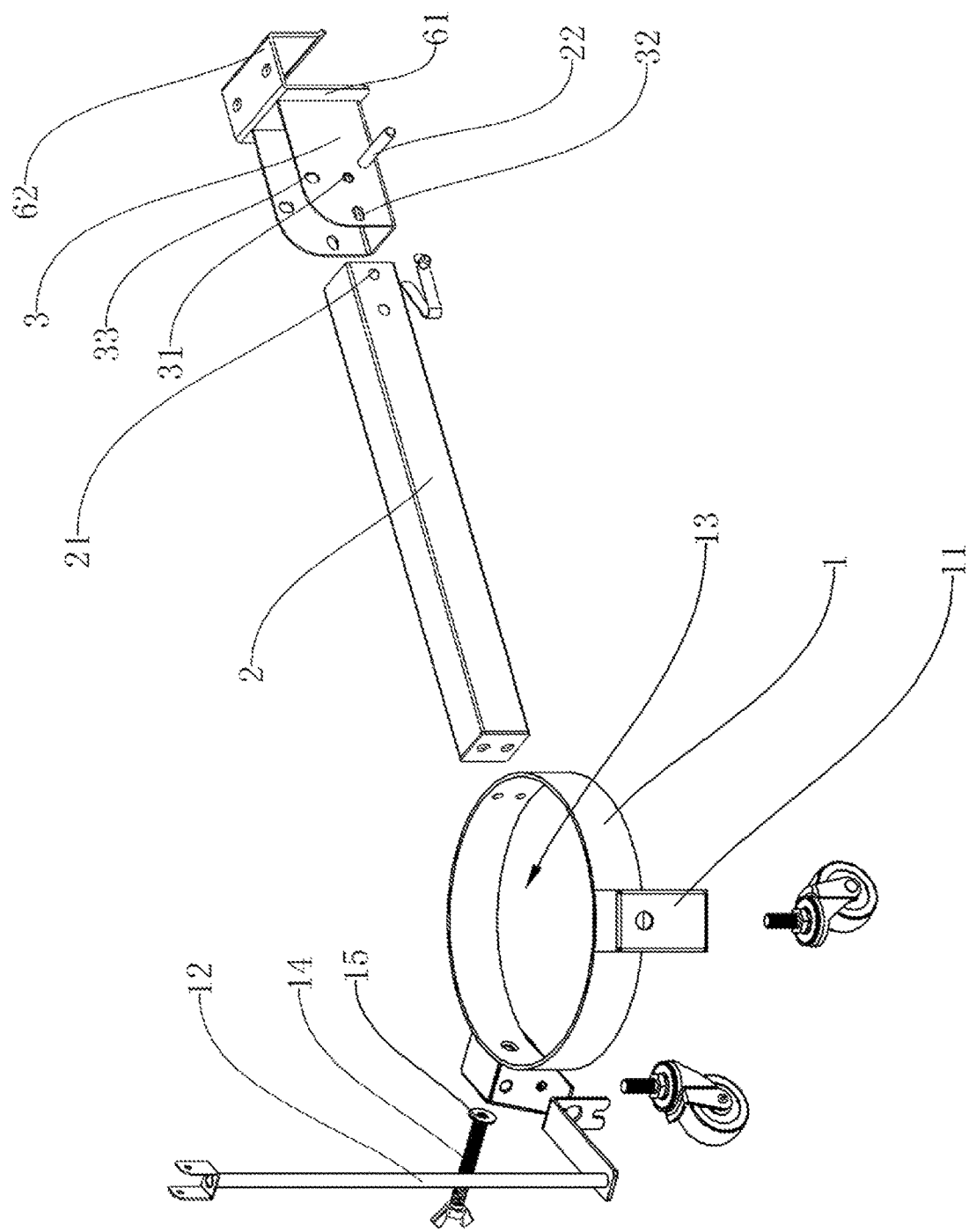
FIG. 5 is an exploded perspective structural view of the foldable tray device according to the invention.

As shown in FIG. 3 to FIG. 5, coupling holes 31 are formed in the base 3, a mounting hole 21 is formed in the connecting rod 2, and the coupling holes 31 and the mounting hole 21 are connected through a hinge pin 22. In this way, the connecting rod 2 can smoothly rotate around the coupling holes 31.

The locking mechanism 50 comprises a button pin 51 mounted on the connecting rod 2. First positioning holes 32 and second positioning holes 33 are formed in the base 3. A connecting line between each of the first positioning holes 32 and a corresponding one of the coupling holes 31 is perpendicular to a connecting line between each of the second positioning holes 33 and a corresponding one of the coupling holes 31. That is, the abovementioned connecting lines have a 90° angle therebetween. Specifically, as shown in FIG. 4, on one side of the base 3, a line connecting the coupling hole 31 and the first positioning hole 32 is perpendicular to a line connecting the coupling hole 31 and the second positioning hole 33. When the button pin 51 is located in the first positioning holes 32, the connecting rod 2 is in a horizontal state, as shown in FIG. 1. When the button pin 51 is located in the second positioning holes 33, the connecting rod 2 is in a vertical state, as shown in FIG. 2.

In this structure, the button pin 51 can be pressed to retreat back into the connecting rod 2 to unlock the connecting rod 2 from the base 3, such that the connecting rod 2 can rotate freely to be folded and stored. When the button pin 51 is aligned to the first positioning holes 32 or the second positioning holes 33, the button pin 51 can stretch out automatically to be clamped in the first positioning holes 32 or the second positioning holes 33 to lock the connecting rod 2 to the base 3. The automatic stretching of the button pin 51 is mainly performed by means of a V-shaped elastic member. The V-shaped elastic member is mounted in the connecting rod 2 and has one end abutting against an inner wall of the connecting rod 2, and the button pin 51 is fixed to the other end of the V-shaped elastic part. When the button pin 51 is pressed, one end of the elastic part moves inwards under the effect of a force to drive the button pin 51 to retreat back into the connecting rod 2. When released, the button pin 51 rebounds automatically under the effect of the elastic force of the elastic part to stretch out of the connecting rod 2 again.

As shown in FIGS. 3-5, the fixing mechanism 6 comprises a fixing plate 61, an L-shaped plate 62 and lock bolts 63. The fixing plate 61 is fixed to a side wall of the base 3, the L-shaped plate 62 is fixed to an upper end of the fixing plate 61, a clamping space 64 is formed between the L-shaped plate 62 and the fixing plate 61, and the lock bolts 63 are mounted on the L-shaped plate 62. In this structure, the clamping space 64 formed between the L-shaped plate 62 and the fixing plate 61 is matched with a frame of the stove, such that the whole base 3 can be disposed on the frame of the stove. The lock bolts 63 can further lock the L-shaped plate 62 on the frame to realize reliable connection.

A plurality of supports 11 are fixed to the side wall of the tray body 1, and the plurality of universal wheels 4 are respectively fixed to the supports 11 in a one-to-one correspondence manner. In this structure, the universal wheels 4 are detachably connected to the corresponding supports 11 through bolts, so that connection is reliable, and later maintenance is facilitated.

A gas tube bracket 12 is fixed to a side wall of one support 11. A gas tube (not shown) can be disposed on the gas tube bracket to be stored in order and prevented from being in a mess.

An accommodating cavity 13 is formed in the tray body 1 and vertically penetrates through the tray body 1, a butterfly bolt 14 is screwed on at least one of the supports 11, a tail end of the butterfly bolt 14 sequentially penetrates through the support 11 and the tray body 1 to extend into the accommodating cavity 13, and a contact piece 15 is fixed to the tail end of the butterfly bolt 14. By adoption of this structure, the butterfly bolt 14 can be adjusted to enable the contact piece 15 to contact with a gas cylinder, such that the tray device can adapt to gas cylinders of different specifications, and the gas cylinder is prevented from shaking excessively.

It should be noted that the above embodiments are merely preferred ones of the invention, and are not intended to limit the protection scope of the patent of invention. Material and structure improvements of the components mentioned above, or substitutions with technical equivalents can be made to the invention. All equivalent structural variations obtained according to the contents of the specification and the drawings of the invention, or direct or indirect applications to other relating technical fields should also fall within the scope of the invention.

What is claimed is:

1. A foldable tray device for a gas cylinder of a stove, the foldable tray device comprising a tray body, a connecting rod and a base, wherein a plurality of universal wheels are arranged at a lower end of the tray body, the connecting rod has a first end fixed to a side wall of the tray body and a second end hingedly coupled to the base, a locking mechanism is arranged between the second end of the connecting rod and the base, and a fixing mechanism configured to be connected to a frame of the stove is arranged on the base, wherein a plurality of supports are fixed to the side wall of the tray body, and the plurality of universal wheels are respectively fixed to the supports in a one-to-one manner such that the plurality of universal wheels are radially outward from the tray body, wherein an accommodating cavity is formed in the tray body and vertically penetrates through the tray body, a butterfly bolt is screwed on at least one of the supports, a tail end of the butterfly bolt sequentially penetrates through the at least one of the supports and the tray body to extend into the accommodating cavity, and a contact piece is fixed to the tail end of the butterfly bolt.

2. The foldable tray device for a gas cylinder of a stove according to claim 1, wherein coupling holes are formed in the base, a mounting hole is formed in the connecting rod, and the coupling holes and the mounting hole are connected through a hinge pin.

3. The foldable tray device for a gas cylinder of a stove according to claim 2, wherein the locking mechanism comprises a button pin mounted on the connecting rod, first positioning holes and second positioning holes are formed in the base, and a connecting line between each of the first positioning holes and a corresponding one of the coupling holes is perpendicular to a connecting line between each of the second positioning holes and a corresponding one of the coupling holes; when the button pin is located in the first positioning holes, the connecting rod is in a horizontal state; and when the button pin is located in the second positioning holes, the connecting rod is in a vertical state.

4. The foldable tray device for a gas cylinder of a stove according to claim 1, wherein the fixing mechanism comprises a fixing plate, an L-shaped plate and a lock bolt, the fixing plate is fixed to a side wall of the base, the L-shaped plate is fixed to an upper end of the fixing plate.

5. The foldable tray device for a gas cylinder of a stove according to claim 1, wherein a gas tube bracket is fixed to a side wall of one of the supports.

* * * * *